United States Patent [19]

Sundelin

[11] Patent Number: 5,738,388
[45] Date of Patent: Apr. 14, 1998

[54] DEVICE FOR PERMANENT JOINING OF TUBES

[75] Inventor: Johan Christian Sundelin, Skarpnack, Sweden

[73] Assignee: Atlas Copco Craelius AB, Sweden

[21] Appl. No.: 700,463

[22] PCT Filed: Mar. 13, 1995

[86] PCT No.: PCT/SE95/00254

§ 371 Date: Nov. 4, 1996

§ 102(e) Date: Nov. 4, 1996

[87] PCT Pub. No.: WO95/25239

PCT Pub. Date: Sep. 21, 1995

[30] Foreign Application Priority Data

Mar. 15, 1994 [SE] Sweden .................... 9400867

[51] Int. Cl.$^6$ .................................. F16L 13/14
[52] U.S. Cl. .................... 285/382; 285/423; 285/921; 285/382.2
[58] Field of Search .................. 285/382, 382.2, 285/921, 423

[56] References Cited

U.S. PATENT DOCUMENTS

| | | |
|---|---|---|
| 5,015,014 | 5/1991 | Sweeney .................... 285/921 X |
| 5,018,555 | 5/1991 | Hawerkemp ................ 285/921 X |
| 5,060,983 | 10/1991 | Lee .............................. 285/921 X |
| 5,071,173 | 12/1991 | Hegler et al. ................ 285/921 X |
| 5,078,430 | 1/1992 | Onge ............................ 285/921 X |
| 5,261,493 | 11/1993 | Brammer ..................... 285/921 X |
| 5,360,242 | 11/1994 | Argent ......................... 285/921 X |
| 5,542,483 | 8/1996 | Edman . | |

FOREIGN PATENT DOCUMENTS

| | | |
|---|---|---|
| 0 441 686 A1 | 8/1991 | European Pat. Off. . |
| 462 444 | 4/1989 | Sweden . |
| 2 166 826 | 5/1986 | United Kingdom . |

Primary Examiner—Dave W. Arola
Attorney, Agent, or Firm—Barnes & Thornburg

[57] ABSTRACT

A device for permanent joining of plastic tubes intended for use as covering or lining tubes when drilling holes in the ground including a female portion on a first tube and a male portion interacting therewith on a second tube. The male portion being provided with annular projections and recesses round its outer circumference and the female portion being provided with annular projections and recesses round its inner circumference with the recesses and projections on one tube interengaging with the projections and recesses on the other tube in such a fashion that at least one of the tubes is radially deformed and the joint can withstand axial and torsional forces.

14 Claims, 2 Drawing Sheets

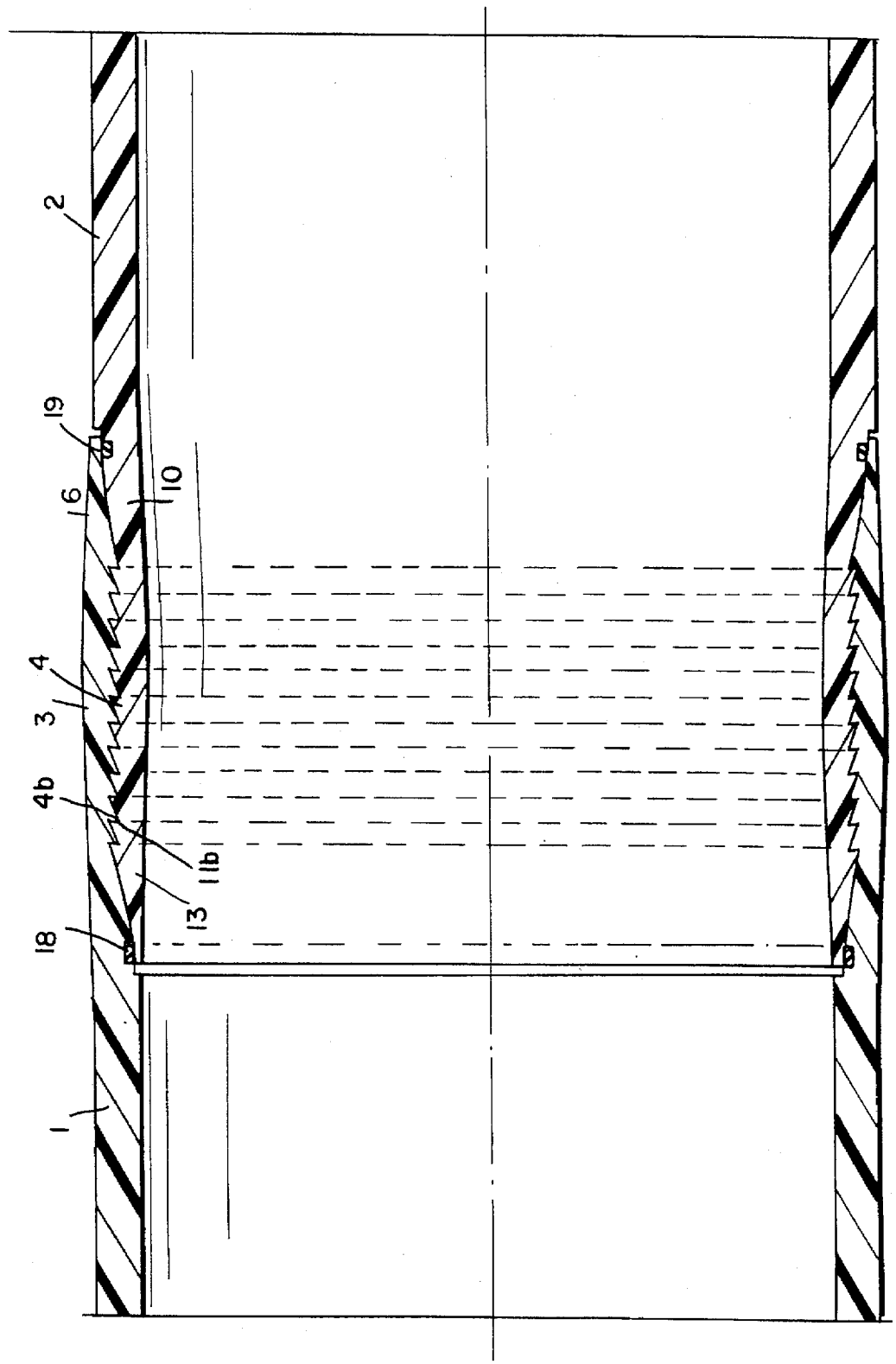

DEVICE FOR PERMANENT JOINING OF TUBES

TECHNICAL FIELD

The present invention relates to a device for permanent joining of tubes made of a flexible material, such as polyethylene, and specially intended for use as covering or lining tubes when drilling holes in the ground, particularly soil or moraine, which device includes a female portion on a first tube and a male portion interacting therewith on a second tube, the male portion being provided with an annular projection round its outer circumference, which under radial deformation thereof and/or of an annular projection on the inner circumference of the female portion is arranged to pass this and to be inserted in an annular recess on the inner circumference of the female portion.

PRIOR ART

Devices of the above described kind are previously known but are used for joining of waste pipes. An example of such a device is shown in GB 2 166 826A.

The main disadvantage of said device is that the joined pipes may be turned relative to each other thereby causing leakage. Another disadvantage is that a relatively low force is required to unintentionally break the joint and a relatively high force is required to provide it.

Devices for joining tubes, together forming a cover or a lining, which are driven into the ground during or after making of a hole therein are previously known from, for example, SE 9200563-6.

The main disadvantage of the last-mentioned device is that special joining elements of metal have to be attached to each tube end, making the product more expensive, and that the joining elements are threaded, requiring turning of at least one of the tubes during the joining process.

DESCRIPTION OF THE INVENTION

It is an object of the present invention to eliminate, at least partly, the above stated disadvantages of previously known devices and to provide a device which is uncomplicated, reliable and strong.

This object is achieved in that the device according to the invention presents the features stated in the characterizing portions of the claims.

DESCRIPTION OF THE FIGURES

FIG. 3 is a longitudinal sectional view showing the male and female portions of FIGS. 1 and 2 joined together.

PREFERRED EMBODIMENT

Figure 1:
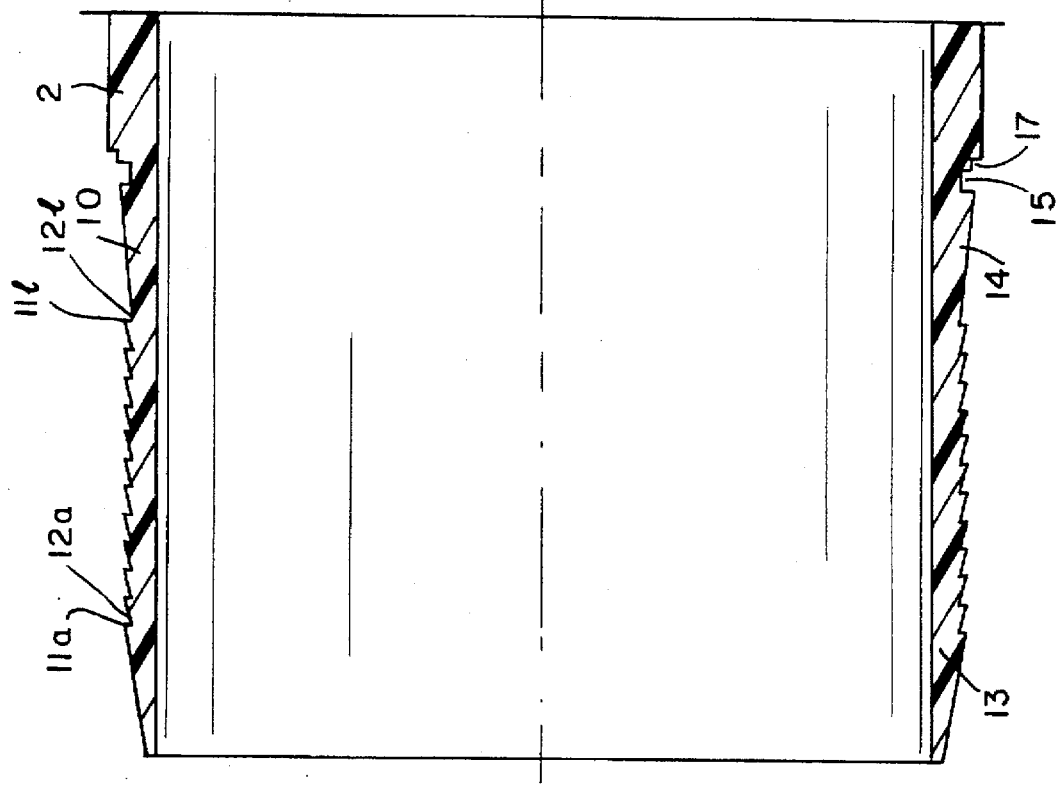
FIG. 1 is a longitudinal sectional view showing part tube provided with a female portion forming part of the device according to the invention.
Figure 2:
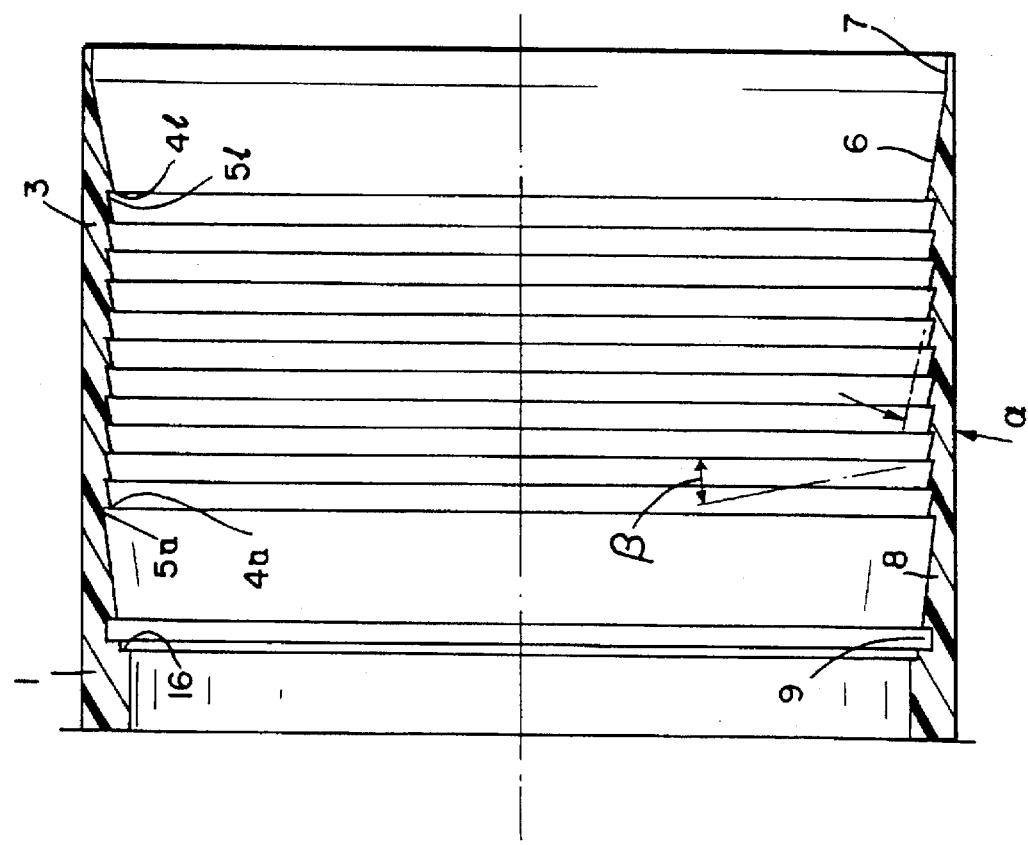
FIG. 2 is a longitudinal sectional view showing part of a second tube provided with a male portion forming part of the device according to the invention.

In FIGS. 1 and 2 there is depicted part of a first tube 1 of circular cross section, and part of a second tube 2 of circular cross section, which in FIG. 3 are shown joined together. The tubes are made of plastic material, suitably PEH (high-density polyethylene) which is flexible, at least in the radial direction.

The tube 1 is provided with a female portion 3, which on the inside is provided with 12 radially inwardly directed, annular projections 4a-1, which are equally spaced in the axial direction and which delimit annular recesses 5a-1 therebetween. The projections 4 and the recesses 5 in cross section together form a saw-tooth pattern having essentially axially oriented surfaces forming an angle $\alpha$ of 5°–15°, preferably around 10° with the longitudinal axis of the tube 1, and having essentially radially oriented surfaces forming an angle $\beta$ of 5°–15°, preferably around 10°, with an axis perpendicular to the longitudinal axis. The distance between two adjacent projections 4 is around 5 mm and the thickness of material in this area is about equal. The tube 1 has an outer diameter of around 100–300 mm, a thickness of material of around 8–10 mm, and a length of around 3 m.

The projection 41, which is nearest to the right-hand tube end, merges on the right into a conical, outwardly tapering portion 6 which is terminated by an end portion 7 of uniform thickness. The recess 5a farthest away from the right-hand tube end merges on the left into a conical, inwardly thickened portion 8, which merges into a groove 9, which merges into the tube 1 itself.

The tube 2 is provided with a male portion 10 provided on its exterior with 12 radially outwardly directed, annular projections 11a-1 which are equally spaced in the axial direction and which delimit annular recesses 12a-1 therebetween. The projections 11 and the recesses 12 in cross section form a saw-tooth pattern of the same dimensions as the saw-tooth pattern formed by the projections 4 and the recesses 5. The tube 2 is of the same dimensions as the tube 1, however, their female and male portions 3, 10 differ in the following respects. The outer diameter of the female portion 3 is equal to the outer diameter of the tubes 1, 2, and the inner diameter of the male portion 10 is equal to the inner diameter of the tubes 1, 2, but the maximum diameter of the projections 11 is larger than the maximum diameter of the recesses 5, and the minimum diameter of the recesses 12 is larger than the minimum diameter of the projections 4. The differences in diameter are around 4–5 mm. The outer diameters of the projections 11 of the male portion 10 is somewhat smaller than the inner diameter of the end portion 7.

The projection 11a, which is nearest to the left-hand tube end of FIG. 2, merges on the left into a conical tapered end portion 13. The recess 111, which is located farthest away from the left-hand tube end, merges on the right into a conical, outwardly thickened portion 14, which merges into a groove 15, which merges into the tube 2 itself.

When making the joint, the male portion 10 is inserted in the female portion 3 or the female portion 3 is pushed onto the male portion 10, the portions 6 and 7 acting as guide means for the portion 13. When the projection 11a has contacted the portion 6 and is increased thereagainst, the diameter of the female portion 3 is increased and the diameter of the male portion 10 is reduced depending on the flexibility/elasticity of the material. On continued compression, the projection 11a will snap over the projection 41 and is inserted in the recess 51, the diameter of the female portion 3 being somewhat reduced and the diameter of the male portion 10 somewhat increased. However, the diameter of the female portion 3 will still be larger and the diameter of the male portion 10 smaller than is the case when the tubes 1 and 2 are separated.

On continued compression of the female and male portions 3 and 10, the projections 11 will snap over the projections 4 in the way described above in connection with the projections 11a and 41 until a shoulder 17 on the female portion prevents further movement of the portion 13 and a shoulder 17 on the male portion 10 prevents further movement of the portion 7.

Before the female and male portions 3 and 10 were brought together to form the joint, sealing rings, such as the O-rings 18 and 19 of FIG. 3, were inserted into the grooves 9 and 15. In the final stage of the compressive movement of the female and male portions 3 and 10, the O-rings were compressed to seal the joint at two points.

In FIG. 3 there is shown the tubes 1, 2 joined in the above described way. It is seem from the figure that the female and male portions 3 and 10 are thickened relative to the walls of the tubes 1, 2 connecting on to the portions 3 and 10. The total wall thickness of the female and male portions 3 and 10 is typically around 10–12 mm. The wall thickness is between 1.1 and 1.4, preferably around 1.25×the wall thickness of the tube 1 or 2. The reason for this thickening is that, as previously mentioned, the female and male portions 3 and 10 are continuously pressed towards each other in the radial direction so that an essentially torsion resistant joint is provided while the resistance of the joint against axial tension is increased.

The joint is permanent and cannot be loosened other than by destroying the female and/or male portions 3, 10. The essentially radially oriented surfaces of the projections 4, 11 abut against each other thereby preventing axial play between the female and male portions 3, 10. The relatively large number of projections effectively prevents the tubes 1 and 2 from being separated. To separate the tubes 1 and 2, when the projections will be deformed, a force is required which for a tube of an outer diameter of around 140 mm is about 55.000N, which should be compared to the fact that the force required to make the joint is only 1000N. The fairly large number of projections 4, 11 provides a large amount of friction between the female and male projections 3, 10, supplying a large amount of torsion resistance and stiffness. Owing to the fairly large number of projections, the difference between their outer and inner diameters may be made relatively small, implying that the thickness of material of the female and male portions may be made relatively large, which is essential to reduce the risk of wearing down of the walls of the female and male portions. Further, the forces that keep the tubes together at the joint are concentrated to the central portions of the joint, gradually diminishing towards the ends thereof, which reduces tendencies for the joint to open on inclining of the tubes 1 and 2.

While only one embodiment of the present invention has been described and shown in the drawings, it will be appreciated that the invention is not limited to said embodiment but only by what is stated in the claims.

I claim:

1. A device for permanent joining of tubes (1, 2) made of flexible materials for use as covering or lining tubes when drilling holes in the ground, the device including a female portion (3) on a first tube (1) and a male portion (10) interacting therewith on a second tube (2), the male portion being provided with annular projections (11a-1) and recesses (12a-1) round its outer circumference and the female portion being provided with annular projections (4a-1) and recesses (11a-1) around its inner circumference, which projections during radial deformation thereof are arranged to pass each other and to be inserted said in annular recesses, the annular projections (11a-1) of the male portion (10) and female portion being flexible and axially spaced, and the recesses (5a-1) of the female portion (3) and male portion being spaced at a distance from each other corresponding to the distance between said projections and in which, in the joining position, the projections of the male portion (10) are inserted with, the projections (11a-1, 4a-1) and the recesses (12a-1, 5a-1) of the male portion (10) and the female portion (3) forming in cross section, a saw-tooth pattern, where each projection has two intersecting surfaces, of which a first surface forms an acute angle (β) with the radial plane and a second surface forms an acute angle (α) with the axial plane, characterized in that, in the joining position, the male portion (10) continuously presses the female portion (3) radially outwards under deformation of at least one of the male and female portions, in that at least some of the projections (4a-1), (11a-1) of at least one of the male portion (10) and the female portion (3) each have a diameter which results in interference engagement between said projections and recesses (12a-1) (5a-1) of the at least one of the female portion (3) and the male portion (10) thereby producing said deformation and also serving for transmitting axial and torsional forces therebetween, and in, both the male portion (10) as well as the female portion (3), said first surface is situated on that side of a diametrical plane through said surfaces' intersection which is opposite to the respective portion's free end.

2. A device according to claim 1, characterized in that an annular portion (13, 6, 7) on the free end of at least one of the male and female portion (10, 3) has a thickness of material which is smaller than the wall thickness of the at least one of the male and female portions and is provided with conical tapering end portions (6, 13).

3. The device of claim 2 wherein at least one of the male and female portion is provided with an annular groove at the junction with the tube, which groove receives a sealing ring.

4. The device of claim 2, wherein the number of projections on the male portion is between five and fifteen.

5. The device of claim 2, wherein the two angles (β, α) are 5°–15° each.

6. The device of claim 5, wherein the number of projections (11a-1) on the male portion (10) is between five and fifteen.

7. The device of claim 1, wherein at least one of the male and female portion (10, 3) is provided with an annular groove (15, 9) at the junction with the tube (1, 2), which groove receives a sealing ring (19, 18).

8. The device of claim 7, wherein the number of projections on the male portion is between five and fifteen.

9. The device of claim 7, wherein the two angles (β, α) are 5°–15° each.

10. The device of claim 9, wherein the number of projections (11a-1) on the male portion (10) is between five and fifteen.

11. The device of claim 1, wherein the number of projections (11a-1) on the male portion (10) is between five and fifteen.

12. The device of claim 11, wherein the two angles (β, α) are 5°–15° each.

13. The device of claim 1, wherein the two angles (β, α) are 5°–15° each.

14. The device of claim 13, wherein the number of projections (11a-1) on the male portion (10) is between five and fifteen.

* * * * *